UNITED STATES PATENT OFFICE.

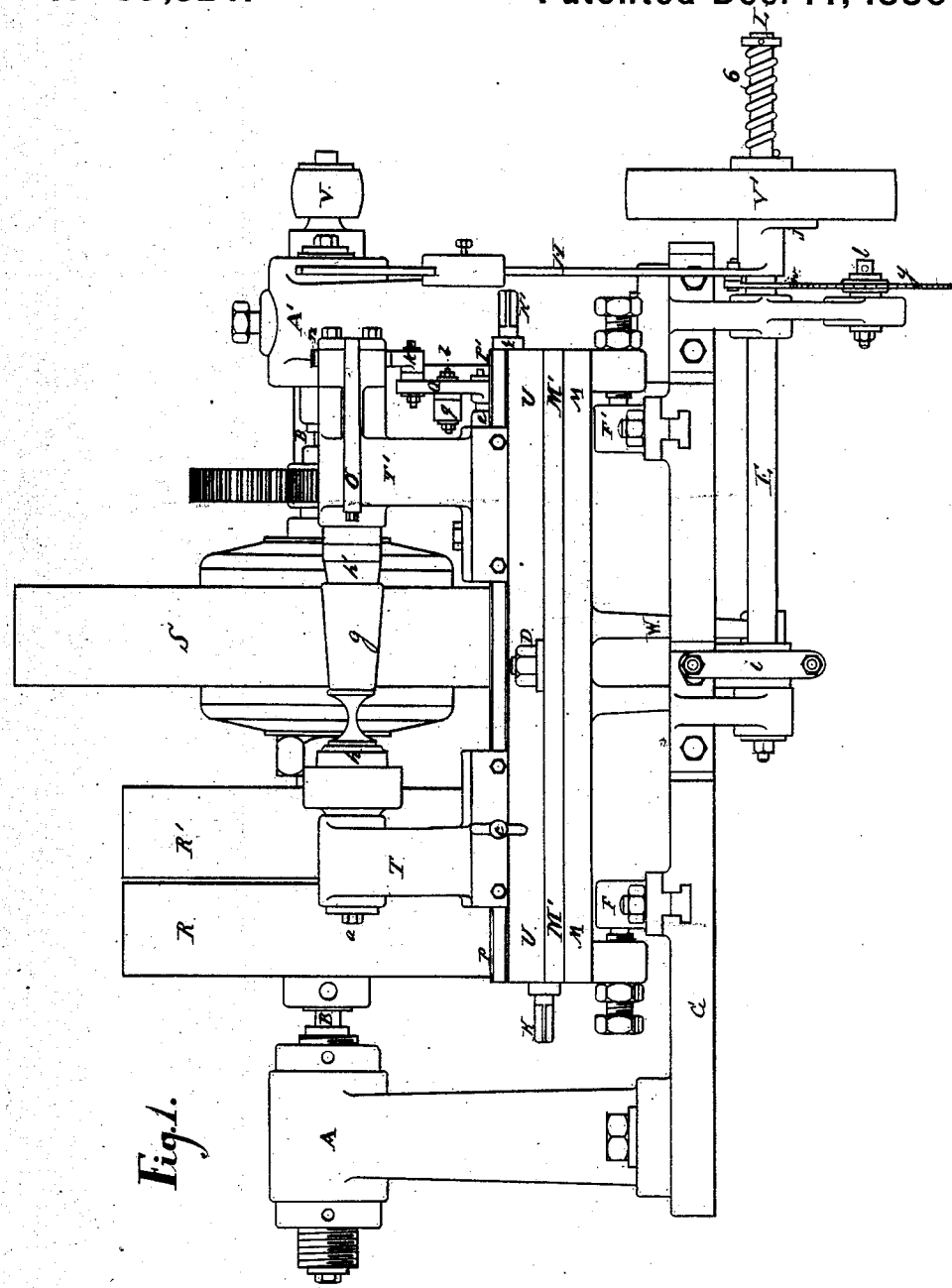

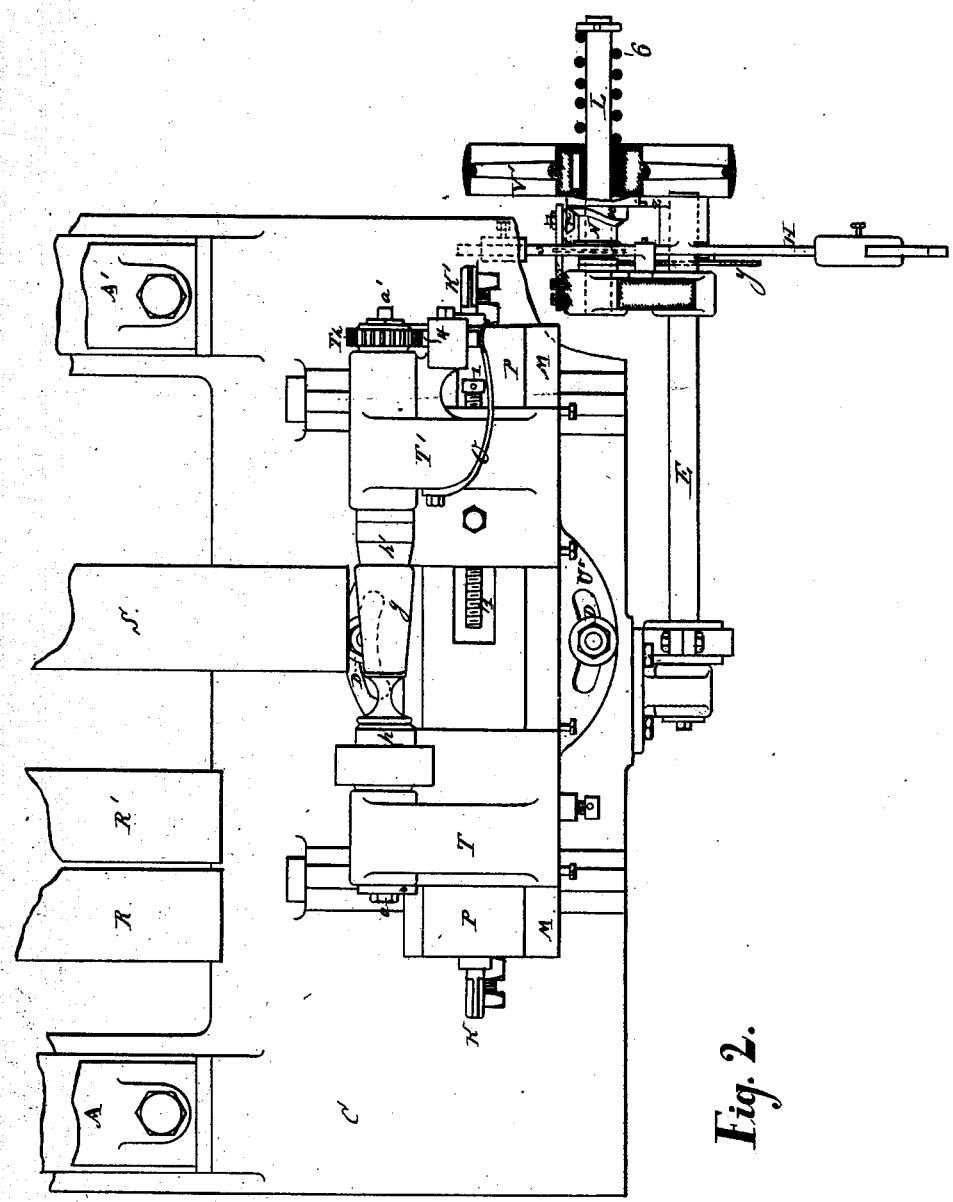

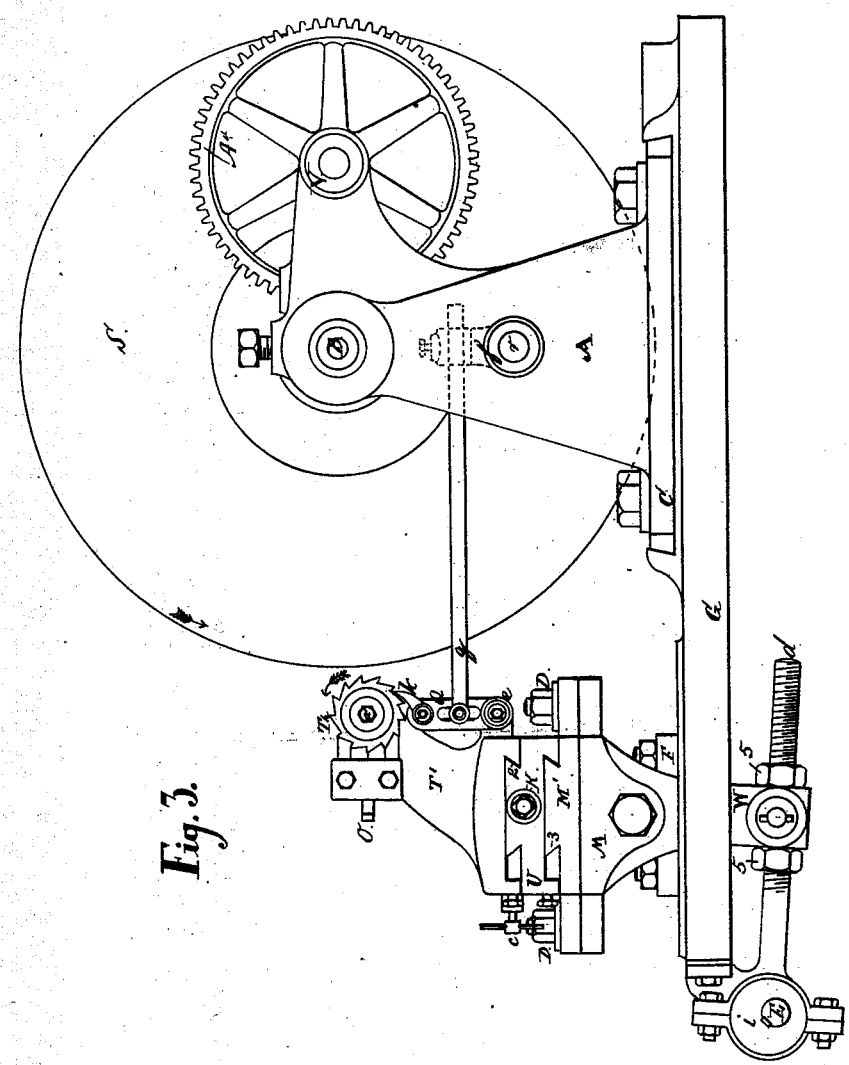

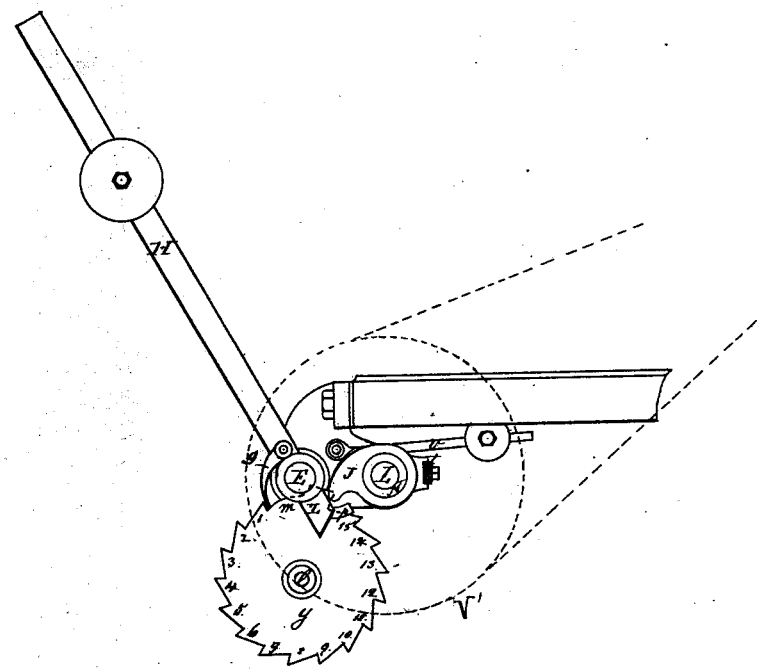

PHILIPP GRIESSMAYER, OF PFORZHEIM, ASSIGNOR TO VOLPP, SCHWARZ & CO., OF FREIBURG, BADEN, GERMANY.

METHOD OF AND MACHINERY FOR CUTTING, GRINDING, AND POLISHING GLASSWARE.

SPECIFICATION forming part of Letters Patent No. 235,524, dated December 14, 1880.

Application filed January 20, 1879.

*To all whom it may concern:*

Be it known that I, PHILIPP GRIESSMAYER, of Pforzheim, Baden, German Empire, have invented a new and useful Improvement in the Method of and Machinery for Cutting, Grinding, and Polishing Glassware, which improvement is fully set forth in the following specification, reference being had to the accompanying drawings.

The object of my invention is to do away with the method and means hitherto employed in grinding or cutting table or other glassware, and to substitute an improved method and improved automatic machinery.

In order to grind or cut the facets upon the surface of glassware the workman hitherto used to stem the glass against an iron disk, the grinding process being done by sand and water, together with the swift rotation of the disk. In this method the damp dust of sand and glass was constantly hurled into the face of the workman and great injury was done to the health of the grinders. The produce, besides, was a very little one, because this mode of grinding requires a great personal exertion and skill. The grinder had to divide the circumference of the glass in so many equal parts as he wanted facets to be cut on the same, and in consequence it seldom happened that these facets were exactly regular.

My improved method of grinding by machinery performs the grinding operation by means of a grinding-stone of particular quality or an emery-wheel, without any preparatory treatment with sand. The work of man is reduced to little more than feeding the glass to the machine and taking the same off when it is completely ground. The glass is ground quite automatically, and one man can work ten machines at a time.

The produce of three skilled grinders hitherto has been about one hundred glasses a day, of about thirteen facets each. Henceforth one man may do one thousand glasses a day with ten machines, or thirty times more than a good hand heretofore was able to do.

The work done by improved lathe is mathematically precise, while it could never be quite exact by the work of hand, as stated before.

The glass leaves this improved lathe in a state fit for immediate polishing. The polish may be done by a similar lathe, only provided with a polishing-wheel instead of a grinding-stone.

In the accompanying drawings, Figure 1, Sheet 1, represents my said improved grinding-machine in front elevation. Fig. 2 is a plan of my said improved lathe. Fig. 3 is a side elevation of the same, and Fig. 4 is a detail view of the weighted lever and the working parts of its operation.

Like parts are indicated by like letters.

The cast bed-plate C of the grinding-machine, which is secured upon a bench or other proper support, carries two vertical pillars, A A', which are provided with suitable bearings, in which the horizontal shaft B turns. Upon the said shaft B the loose and fast pulleys R R' and the grinding-stone S (or emery-wheel) are mounted, the said pulleys receiving motion from a driving-band and any prime motor.

The lathe mechanism for supporting the article to be ground or cut is arranged in front of the revolving stone S and adjusted to the said bed-plate C, and said mechanism is so constructed and organized that it automatically performs the following operations: First, carrying the glass article to be ground or cut against the turning-stone; second, removing it from the same whenever one facet has been finished; third, turning the glass at the exact time and to the required extent for cutting or grinding the next facet; and, fourth, stopping the grinding or cutting operation at the time when the last facet is finished.

The glass $g$ is supported between two chucks, $h\ h'$, preferably made of cork, which cork chucks will adjust themselves to the shape of the glass, and may be readily exchanged for others suited to different-sized glasses. The centers $a\ a'$ of the said chucks rest in bearing-heads T T', which are supported by a traversing carriage. This carriage consists of a top plate, U, having a bevel-sided longitudinal guiding-rib, 2, upon which the base-block of the standards T T' may slide; of a central plate, M', having a longitudinal guiding-rib, 3, upon which the top plate, U, may slide; and of a bottom plate, M, upon which the central plate, M', is pivoted so as to oscillate horizontally. The said bottom plate, M, which thus supports the plates M′ and U, is pivoted at its ends in adjustable bearing-blocks F F′.

The head T is adjustable horizontally upon the top plate, U, and is fixed in any adjusted position thereon by means of a set-screw, c, which, when loosened, enables one to slide the said head to any desired position. The other head, T′, has its horizontal movement imparted to it by means of a screw-threaded spindle, 1, actuated by a winch, K′, which spindle runs in a nut projecting from the head into a slotted opening of the top plate. (See Fig. 2.)

The top plate, U, together with the middle plate, M′, which supports it, may be swung bodily upon the bottom plate, M, to which the plate M′ is pivoted centrally by means of driving screw-threaded spindle attached to an arm at one end of the said plate and running in a screw-nut fixed to the bottom plate, M′, or by means of a projecting plate—as U′—that has a slot through it in the form of an arc, through which passes a set-screw, as D.

The top plate, P, and the heads T T′ carried thereby may together be adjusted longitudinally upon the middle plate, M, by means of a screw-threaded spindle, K, that runs in bearings in the said plate M′ and engages a nut formed by a downward-projecting lug extending from the plate P into a recess in the said middle plate. Thus the proper movement of the top plate will adjust the glass to a proper longitudinal position with respect to the grinding-wheel, the swinging of the middle plate will adjust the glass into parallelism with the grinding-surface, and the rocking of the bottom plate upon its pivots will adjust the surface of the glass at a proper inclination to said grinding-surface.

The standard T′ carries at the end of the journal that supports the shaft of the chuck h′ a sliding bolt, 4, (seated upon a spring, O,) that engages the teeth of a ratchet-wheel, T h, fast upon said shaft, and thus acts to prevent the chuck from turning in said bearing during the grinding operation.

The lathe mechanism is automatically operated to carry the glass against the grinding-wheel and withdraw it therefrom at proper intervals of time by the following mechanisms: A pair of rock-arms, W, are fast to and depend from the central portion of the bottom plate, M, and support between them a journaled socket-piece, in the screw-threaded opening of which runs a screw-rod, d, said rod being attached at its outer end to an eccentric or crank wheel, i, carried at the end of a rock-shaft, E. The distance between the wheel i and the socket-piece may therefore be made greater or less by properly rotating said screw, which might be done by journaling it in a box pivoted to the crank-wheel. This adjustment may, however, be accomplished by omitting the screw-thread from the socket-piece, and placing jam-nuts, as 5 5, upon each side of said socket-piece.

The throw of the eccentric or crank wheel i is sufficient to rock the plates M, M′, and U and the mechanism supported by them from the position shown in Figs. 3 and 4, in the former of which the said plates and the chucks they support are shown in their rearward position, while in the latter figure the lever H, that is fast upon the rock-shaft E, is in its raised position. It will now be understood that as the lever H descends to a horizontal position such movement of it will rock the shaft E sufficiently to cause the eccentric or crank wheel i to throw the rod d to such an extent as to rock the arms W and move the chucks carrying the glass against the surface of the grinding-wheel, and as the forward movement and pressure of the glass against the grinding-wheel are performed by this weighted lever H, it follows that when said lever reaches the extent of its throw and assumes its horizontal position one facet will be finished.

In order to begin and perform the grinding of a new facet, it is necessary to withdraw the glass from the stone S, (which requires the raising of the lever H,) to turn the glass sufficiently to present a new portion of its surface, and to rock the shaft E by means of said lever to again carry the glass against the stone S.

The lever H is automatically operated as follows: It has projecting from its lower end, or the bearing by which it is hung fast upon the shaft E, a tappet, Z, which is periodically engaged by a cam, J, fast upon the shaft L of a pulley, V′, that is rapidly revolved by a band connecting with a pulley, V, mounted upon a shaft that is revolved at high speed by means of a toothed wheel, $A^4$, gearing with a pinion on the main shaft B. When the cam J strikes the tappet Z it vibrates the lever H upward, and thus rocks the shaft E and vibrates the chucks away from the stone S. When this lever has thus been carried into its highest position it is not instantaneously set free to drop suddenly, and thus carry the glass violently against the stone S, but the cam-surface J passes slowly over its rock-arm Z, and thus allows the glass to gently engage the stone and support the lever, which lever thereafter descends as the surface of the glass is ground away by the stone.

As the pulley V′ is rapidly revolved, it would appear that at each of its rotations the cam J carried by it will engage the rock-arm Z and raise the lever H. If such were the fact, the grinding operation of one facet would be dependent upon one rotation of the pulley V′, while it is necessary that the duration of this operation shall depend alone upon the grinding power of the stone. The lever H must accordingly not be raised again until it has been permitted to reach its lowest or horizontal position by reason of the finishing of the facet being cut or ground. To this end, after the lever has been raised by the cam J, said cam must rotate out of the plane of engagement with the rock-arm Z until said lever has made its descent. This is accomplished as follows: Fast upon the rear face of the said cam J is a spiral or face cam, X, against which bears a tenon, n, that may carry a friction-wheel. As the pulley V' rotates and carries the cam J against the tappet Z to raise the lever H the spiral or face cam X rides against the tappet n, and thus is driven outward, carrying with it the box or bearing N of said pulley V' against the pressure of its spring 6, while a pivoted lever, v, Fig. 4, drops down behind a rib, t, Fig. 2, carried by said bearing N, and holds said pulley in its outward position, wherein its cam J is out of alignment with the tappet Z, and it will rotate without actuating said lever. When, however, the lever H has reached its lowest position and the facet is finished, an arm, p, Fig. 4, carried by said lever is brought up underneath the said pivoted lever v, and raises the same from behind the rib t, thus releasing the pulley V', whose spring 6 quickly moves it inwardly into proper position for its cam J to again engage the tappet Z and raise the lever. Said lever will therefore only be raised after it has arrived at the end of its downward stroke and a facet is completely finished.

When the desired number of facets have been cut upon the glass the automatic presentation of it to the grinding-surface must be stopped.

A stopping mechanism constructed as follows is employed: Below the shaft E a toothed disk, y, is loosely mounted upon a stud, l, the teeth of which are properly numbered. One tooth of said disk is formed irregularly, and projects sufficiently to be against the shaft E, (dotted lines, Fig. 4.) A pawl, 9, carried by the lever H engages the teeth of this ratchet-wheel, so as to rotate the same at each vibration of said lever. As the said pawl falls behind a tooth as it reaches its highest position, it follows that when the irregular tooth is seated against the shaft E and the lever has been raised and the pawl 9 engaged a further vibration of the lever will be suspended. Upon disengaging the pawl 9 the ratchet-wheel may be set to permit as many descents of the lever H as there are facets to be cut, and when the rotation of the ratchet-wheel is suspended the lever H will remain raised; hence it cannot disengage the lever v, and the pulley V' must rotate in its outermost position, and therefore its cam J cannot engage the tappet Z of the lever H.

The glass will be turned automatically for a certain part of its circumference at the precise time when each facet is finished. This is performed at the time when the weighted lever is rising, or during the retreating movement of the chucks, as follows:

The chuck a' has mounted upon its outer end the ratchet-wheel T h, which ratchet-wheel is engaged by a pawl, k, carried at the upper end of a rocking bar, Q, that works on a center, e, by which it is attached to the standard T'. This rocking bar Q is slotted to adjust the end of a rod, q, that connects it to a box, f, that is pivoted at r to the pillar A. As soon as the standards or bearing-heads T T', with the chucks and the glass carried by them, are moved toward the stone S by the descending action of the lever H the pawl k glides downward upon the circumference of the ratchet-wheel T h a little more than the space of one tooth. When the heads T T', the chucks, and glass supported thereby are moved away from the stone S the pawl k will engage a tooth of the ratchet-wheel T h and rotate in the direction of the arrow, thus turning said disk the distance of one tooth and rotating the glass a corresponding distance.

The rod q may be adjusted in the box f by a screw, so that its position and that of the rocking bar Q and pawl k with respect to any lateral or horizontal adjustment of the bearing-head T' or plates U M' M may be properly adjusted.

The stroke of the pawl k may be govered by adjusting the rod q within the slot of the rocking bar Q.

The disk T h must have as many teeth as the glass is intended to have facets. Hence different disks, all of the same diameter, but having different numbers of teeth, may be used.

In operating this mechanism the glass g is mounted between the chucks h h' and adjusted in proper position relative to the stone S by moving the heads T T' and plates U M' M. A disk, T h, having as many ratchet-teeth as the glass is to have facets, is then fixed upon the shaft a'. The rod d is adjusted in the hangers W by lengthening or shortening the same according to the depth of the intended cut. The pawl 9 of the lever H is engaged in that tooth of the disk y that corresponds in number with that of the facets to be cut, which number is, of course, equal to the teeth of the ratchet T h. These adjustments made, the lever H, which has been arrested by the disk-projection m striking the shaft E while the pawl 9 engages a tooth of said disk, is set free to descend. The grinding operation will then go on automatically and uninterruptedly until the glass g has been provided with its full number of facets, all of which will be of precisely the same extent and depth.

I claim—

1. The combination, with the grinding-stone S, of the means for adjusting the relation of the glass supported by the chucks with respect to the surface of said stone, said means being a reciprocating top plate, U, an oscillating central plate, M', and a bottom-supporting plate, M, substantially as described.

2. The combination, with the grinding-stone S and the glass supporting and revolving chucks carried by the supporting-plates U M' M, of the horizontally-adjusting bearing-blocks T T', substantially as described.

3. The combination, with the grinding-stone S, the chucking devices, and the means substantially as described for adjusting relation of the glass to said stone, of a vibrating carriage supporting the chucks and mechanisms for vibrating said carriage, as follows: the weighted lever H, its rock-arm Z, the wheel V', and its cam $j$, substantially as described.

4. The combination, with the vibrating carriage, pivoted at F F', as shown, of the rod $d$, eccentric or crank $i$, shaft E, weighted lever H, tappet Z, wheel V', cam $j$, face-cam X, tappet $n$, lever $r$, pawl 9, and ratchet-wheel $y$, substantially as described.

5. The mechanism for automatically turning the chucks $h$ $h'$, consisting of the rod $q$, slotted rocking lever Q, pawl $k$, and ratchet-disk T $h$, in combination with the pivoted vibrating carriage W M M' U, substantially as described.

In testimony whereof I have signed my name to this specification in the presence of two subscribing witnesses.

PHILIPP GRIESSMAYER.

Witnesses:
MÜLLER,
J. ENGLETT.